US012584555B2

(12) United States Patent
Al-Darra

(10) Patent No.: US 12,584,555 B2
(45) Date of Patent: Mar. 24, 2026

(54) ANTI-ROTATIONAL CAP SEAL

(71) Applicant: A.W. CHESTERTON COMPANY, Groveland, MA (US)

(72) Inventor: Pierre Aouni Alfons Al-Darra, Eching (DE)

(73) Assignee: A.W. CHESTERTON COMPANY, Groveland, MA (US)

( * ) Notice: Subject to any disclaimer, the term of this patent is extended or adjusted under 35 U.S.C. 154(b) by 0 days.

(21) Appl. No.: 18/593,674

(22) Filed: Mar. 1, 2024

(65) Prior Publication Data

US 2024/0344611 A1     Oct. 17, 2024

Related U.S. Application Data

(60) Provisional application No. 63/449,143, filed on Mar. 1, 2023.

(51) Int. Cl.
*F16J 15/3208* (2016.01)
*F16J 15/3284* (2016.01)
*F16J 15/56* (2006.01)

(52) U.S. Cl.
CPC ....... *F16J 15/3208* (2013.01); *F16J 15/3284* (2013.01); *F16J 15/56* (2013.01)

(58) Field of Classification Search
CPC ........ F16J 15/166; F16J 15/32; F16J 15/3208; F16J 15/3216; F16J 15/322;
(Continued)

(56) References Cited

U.S. PATENT DOCUMENTS 2,968,501 A * 1/1961 Tisch ........................ F16J 15/32
                                                            285/918
3,149,848 A * 9/1964 Galloway ................ F16J 15/32
                                                            277/584
(Continued)

FOREIGN PATENT DOCUMENTS

CH           461 203 A      8/1968
DE        35 21 525 C1     11/1986
(Continued)

OTHER PUBLICATIONS

International Search Report and Written Opinion, PCT/US2024/018088, dated Jun. 28, 2024, 15 pages.

*Primary Examiner* — Nicholas L Foster
(74) *Attorney, Agent, or Firm* — Nelson Mullins Riley & Scarborough LLP; Anthony A. Laurentano

(57)     ABSTRACT
A seal having a gland having a gland grove and a sealing assembly for seating in the gland groove. The sealing assembly includes an energizer element and a cap element. The energizer element has outwardly extending first surface features formed on each side portion that are sized and configured for contacting the side walls of the gland groove when the energizer element is seated therein. The top portion of the energizer element has a second surface feature forming a first connection component. The cap element has a bottom portion that has associated therewith a surface feature forming a second connection component. The coupling together of the first connection component and the second connection component inhibits rotation of the cap element relative to the energizer element.

16 Claims, 3 Drawing Sheets

(58) Field of Classification Search
CPC .. F16J 15/3224; F16J 15/3248; F16J 15/3268;
F16J 15/3284
See application file for complete search history.

(56)                    References Cited

U.S. PATENT DOCUMENTS

| 3,149,849 | A | * | 9/1964 | Baldridge | F16J 15/32 |
| | | | | | 277/589 |
| 3,614,114 | A | * | 10/1971 | Traub | F16J 15/32 |
| | | | | | 277/589 |
| 3,663,024 | A | * | 5/1972 | Traub | F16J 15/3208 |
| | | | | | 277/910 |
| RE28,105 | E | * | 8/1974 | Traub | F16J 15/32 |
| | | | | | 277/910 |
| 4,101,140 | A | * | 7/1978 | Reid | F16J 15/32 |
| | | | | | 277/475 |
| 4,190,259 | A | * | 2/1980 | Zitting | F16J 15/32 |
| | | | | | 277/584 |
| 4,448,429 | A | * | 5/1984 | Thomas | F16J 15/32 |
| | | | | | 277/589 |
| 4,890,849 | A | * | 1/1990 | Eason | F16J 15/46 |
| | | | | | 277/422 |
| 5,018,753 | A | * | 5/1991 | Porel | F16J 15/32 |
| | | | | | 277/589 |
| 5,149,107 | A | * | 9/1992 | Maringer | F16J 15/3208 |
| | | | | | 277/560 |
| 6,450,502 | B1 | * | 9/2002 | Baehl | F16J 15/3208 |
| | | | | | 277/589 |
| 6,607,197 | B2 | * | 8/2003 | Baehl | F16J 15/164 |
| | | | | | 277/552 |
| 9,316,317 | B2 | * | 4/2016 | Okamura | F16J 15/3268 |
| 10,202,989 | B2 | * | 2/2019 | Alday | F16J 15/3208 |
| 11,512,779 | B2 | * | 11/2022 | Krebs | F16J 15/3284 |
| 2016/0076651 | A1 | * | 3/2016 | Alday | F16J 15/3208 |
| | | | | | 277/589 |
| 2022/0205537 | A1 | * | 6/2022 | Okabe | F16J 15/3204 |

FOREIGN PATENT DOCUMENTS

| JP | 2005 221028 A | 8/2005 |
| JP | 2018 119672 A | 8/2018 |
| JP | 2018 179159 A | 11/2018 |
| WO | 2012/102250 A1 | 8/2012 |

* cited by examiner

ANTI-ROTATIONAL CAP SEAL

RELATED APPLICATION

The present application claims priority to U.S. provisional patent application Ser. No. 63/449,143, filed on Mar. 1, 2023, and entitled Mechanical Seal, the contents of which are herein incorporated by reference.

BACKGROUND OF THE INVENTION

The present invention relates to sealing assemblies for mechanical devices, and more particularly relates to a sealing assembly for use with a mechanical apparatus that has a reciprocating or rotating shaft.

Conventional seal element assemblies are employed in a wide variety of environments and settings, such as for example, in connection with various mechanical apparatuses (e.g., stationary equipment), such as valves and pumps, to provide a fluid-tight seal. The sealing element assemblies are usually positioned about a reciprocating or rotating shaft or rod that is mounted in and protrudes from a stationary mechanical housing. The sealing element assembly is usually mounted in a gland structure which can be secured to a housing of the mechanical apparatus at the shaft exit, thus preventing the loss of pressurized process fluid from the housing.

A conventional type of sealing element assembly used to form a seal against a shaft is a cap or shaft seal. The cap seal is used to prevent the leakage of fluids, such as a process fluid, from the shaft and to prevent contaminants, such as dirt and water, from entering the seal. This helps to maintain proper lubrication, reduce friction, and extend the life of the stationary equipment. The conventional cap seal typically consists of a flexible lip element, commonly made of rubber or another elastomeric material, which contacts the rotating shaft. The lip element creates a fluid barrier that prevents the escape of fluids from and the entry of contaminants into the stationary equipment. The cap seals contribute to the efficient operation and longevity of rotating equipment by preserving the integrity of the lubricating system.

A drawback of conventional sealing element assemblies, such as cap seals, is that as the movable shaft or rod ages, the radially outer face of the shaft (i.e., the face of the shaft presented to the sealing surface of the seal) may become inconsistent, pitted, pocked, damaged, or otherwise made uneven. If the sealing surface of the cap seal, such as the lip element, cannot conform to the uneven surface of the shaft, the cap seal is not capable of maintaining a fluid tight seal with the shaft. Conventional cap seals are also sensitive to shaft misalignment. Specifically, if the shaft deviates from an ideal position, the cap seal can experience uneven wear, leading to reduced effectiveness and potential leakage. While cap seals are designed to prevent the entry of contaminants, conventional cap seals can still be susceptible to damage or failure in environments with particularly abrasive or corrosive substances. Particles or chemicals may compromise the seal formed by the cap seal over time. Still further, high-speed applications where the shaft rotates at high speeds can pose challenges for conventional cap seals. The friction between the lip element of the cap seal and the rotating shaft can generate heat, causing accelerated wear and potentially reducing the seal's efficiency, or can cause relative unwanted movement between the cap seal components that is caused by the rotating shaft.

SUMMARY OF THE INVENTION

The present invention is directed to a mechanical seal or seal assembly that employs a sealing assembly for forming a seal with a rotating shaft. Specifically, the sealing assembly includes a gland having a gland groove formed in an inner surface for mounting or seating a sealing element assembly. The sealing element assembly includes an energizer element and a cap element. The energizer element and the cap element remain stationary relative to each other during use since the sealing elements are mechanically linked together in a selected manner to prevent or inhibit relative rotation therebetween. The sealing elements of the sealing element assembly remain stationary relative to each other during use, especially in relatively high-speed applications. Further, the sealing element assembly functions as a double-acting sealing assembly since the assembly is configured to absorb pressure from both sides (e.g., right side and left side) during use.

According to one embodiment, the present invention is directed to a mechanical seal or seal assembly that includes a gland and a sealing assembly. The gland has an inner surface having a gland groove formed therein. The gland groove includes opposed side walls and a floor portion. The sealing assembly is sized and configured for mounting at least partly within the gland groove. The sealing assembly includes an energizer element and a cap element. The energizer element has a main body having first and second opposed side portions, a bottom portion, and a top portion, where each of the first and second side portions has an outwardly extending first surface feature formed thereon that is sized and configured for contacting the side walls of the gland groove when the energizer element is seated within the gland groove. The top portion has associated therewith a second surface feature forming a first connection component. The cap element has a main body having first and second opposed side portions, a bottom portion and an opposed top portion, where the bottom portion has associated therewith a surface feature forming a second connection component. The coupling together of the first connection component and the second connection component forms a connection assembly that inhibits rotation of the cap element relative to the energizer element.

According to one practice, the outwardly extending surface features are formed along the side portions between the bottom portion and the top portion. The width of the energizer element at an outermost portion of the surface features is greater that a width of the gland groove, such that the energizer element is seated within the gland grove by a mechanical fit, such as a press fit. Further, the bottom portion of the energizer element contacts the floor portion of the gland groove when the energizer element is mounted therein. The second surface feature of the energizer element is configured to extend outwardly from the top portion to form the first connection component. The second surface feature includes first and second opposed side walls and a top wall connecting the first and second side walls. According to one embodiment, one or more of the first and second side walls or the top wall includes chamfered edges to form a pair of opposed sloped or slanted surfaces. The width of the second surface feature as measured between the side walls is less than a width of the main body as measured between the side portions.

According to one embodiment, the surface feature of the cap element includes a channel that is formed within the bottom portion. The side portions or the top portion of the main body of the cap element can include one or more chamfered edges. Further, the top portion of the cap element has one or more grooves formed therein for reducing a contact area between the shaft and the top surface of the cap element during use.

The present invention is also directed to a sealing element assembly that is suitable for mounting in a gland groove formed in a gland of a mechanical seal. The sealing element assembly includes an energizer element and a cap element forming a cap seal. The energizer element has a main body having first and second opposed side portions, a bottom portion, and a top portion, where each of the first and second side portions has an outwardly extending first surface feature formed thereon that is sized and configured for contacting side walls of the gland groove when the energizer element is seated therein. The top portion has associated therewith a second surface feature forming a first connection component. The cap element has a main body having first and second opposed side portions, a bottom portion and an opposed top portion, where the bottom portion has associated therewith a surface feature forming a second connection component. The coupling together of the first connection component and the second connection component forms a connection assembly that inhibits rotation of the cap element relative to the energizer element.

The outwardly extending surface features of the energizer element are formed along the side portions between the bottom portion and the top portion. A width of the energizer element at an outermost portion of the opposed surface features is greater that a width of the gland groove, such that the energizer element is seated within the gland grove by a press fit. The second surface feature of the energizer element is configured to extend outwardly from the top portion to form the first connection component. The second surface feature has first and second opposed side walls and a top wall connecting the first and second side walls, where one or more of the first and second side walls or the top wall includes chamfered edges to form a pair of opposed sloped or slanted surfaces. The second surface feature has first and second opposed side walls and a top wall connecting the first and second side walls, where a width of the second surface feature as measured between the first and second side walls is less than a width of the main body as measured between the side portions.

Further, the surface feature of the cap element includes a channel that is formed within the bottom portion. The top portion of the cap element includes one or more grooves formed therein for reducing a contact area between the shaft and the top portion of the cap element during use.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principals of the invention and, although not to scale, show relative dimensions.

DETAILED DESCRIPTION OF THE INVENTION

Figure 1:
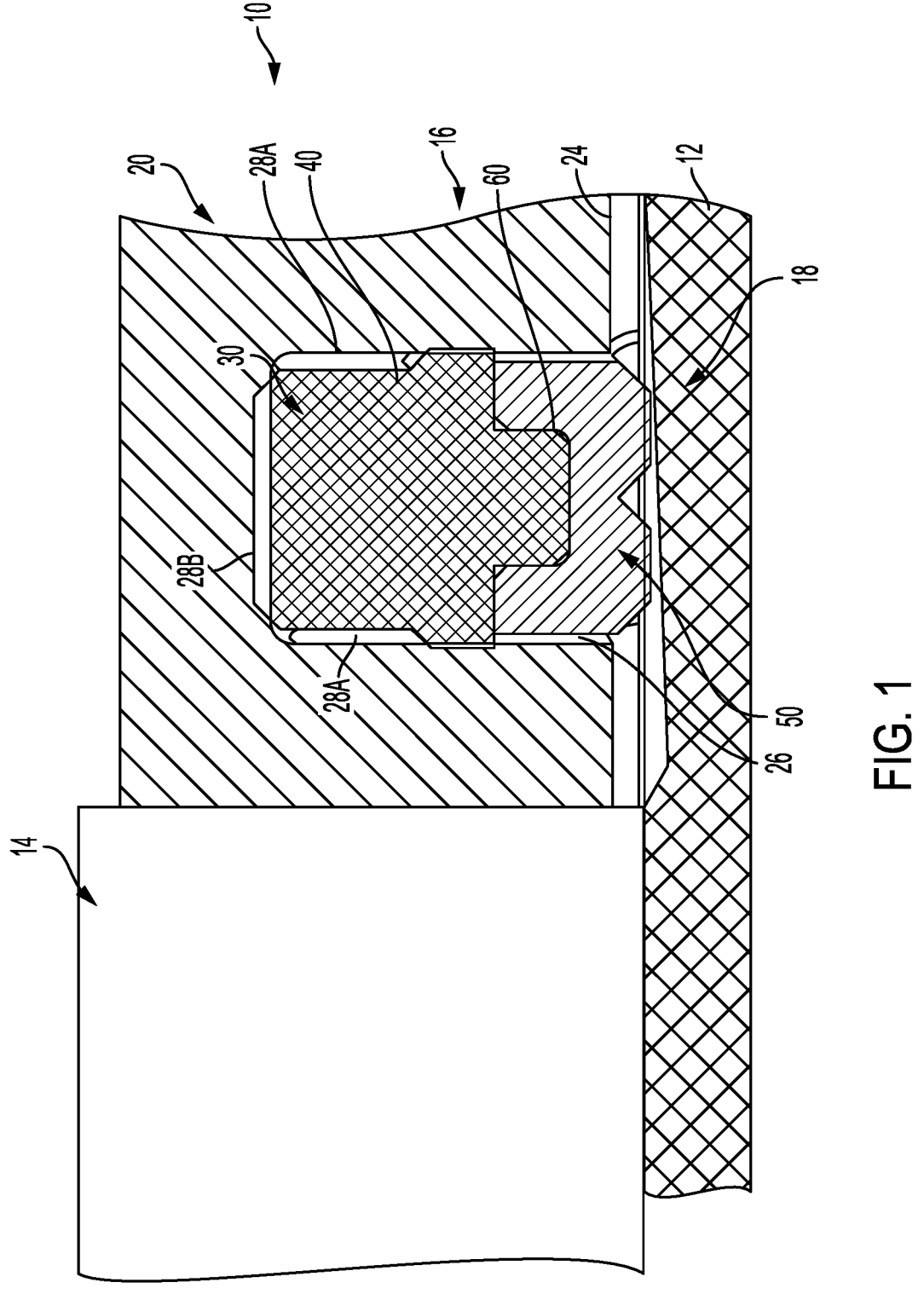
FIG. 1 is a partial cross-sectional view of a mechanical seal that employs a sealing assembly that is mounted to stationary equipment having a rotating shaft according to the features of the present invention.

The present invention provides a sealing assembly for providing sealing on a rotating shaft or other suitable device. The invention will be described below relative to illustrated embodiments. Those skilled in the art will appreciate that the present invention may be implemented in a number of different applications and embodiments and is not specifically limited in its application to the particular embodiment depicted herein.

The term "shaft" is intended to refer to any suitable device in a mechanical system to which a seal can be mounted and includes shafts, rods and other known devices. The shaft is moveable in selected directions and can be a reciprocating or a rotating shaft.

The terms "axial" and "axially" used herein refer to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

The term "axially inner" as used herein refers to that portion of the stationary equipment and/or components of a mechanical sealing assembly that are disposed proximate to the mechanical system employing the seal assembly. As such, the components of the sealing assembly are mounted within the equipment or are disposed the deepest within or closest to the equipment (e.g., inboard). Conversely, the term "axially outer" as used herein refers to the portion of stationary equipment and a seal assembly distal from the mechanical system (e.g., outboard).

The term "radially inner" as used herein refers to the portion of the sealing assembly or associated components that are proximate to a shaft. Conversely, the term "radially outer" as used herein refers to the portion of the seal assembly or associated components that are distal from the shaft.

The terms "stationary equipment" and/or "static surface" as used herein are intended to include any suitable stationary structure housing a shaft or rod to which a seal having a gland is secured. Those of ordinary skill will also recognize that the gland assembly can form part of the mechanical seal or part of the stationary equipment.

The terms "process medium" and/or "process fluid" as used herein generally refer to the medium or fluid being transferred through the stationary equipment. In pump applications, for example, the process medium is the fluid being pumped through the pump housing.

The term "gland" or "gland element" as used herein is intended to include any suitable structure that enables, facilitates, or assists securing the mechanical seal and the sealing assembly to the stationary equipment, while concomitantly surrounding or housing, at least partially, one or more seal components. If desired, the gland can also provide fluid access to the mechanical seal.

The term "mechanical seal" or "seal assembly" as used herein is intended to include various types of mechanical seals, including cap seals, single seals, split seals, tandem seals, dual seals, concentric seals, gas seals, spiral seals, solid seals, split seals and other known seal types and configurations.

The term "sealing assembly" is intended to refer to a combination of components employed in a mechanical seal that is mounted in or coupled to stationary equipment, and the components can be sized and configured to form a secure and effective seal with a movable shaft associated with the stationary equipment. The sealing assembly can include multiple sealing components forming a sealing element assembly that is mounted or coupled to a gland element. The sealing components depend upon the type of sealing assembly employed. For example, in a cap seal, the sealing components can include an energizer element and a sealing or cap element.

The present invention is directed to a mechanical seal or seal assembly for sealing against a housing of stationary equipment having a rotating shaft. The mechanical seal can be a mechanical or hydraulic seal for use with a rotating shaft. According to one embodiment, the mechanical seal can employ a sealing assembly having a gland and a sealing element assembly having multiple different types of sealing components or elements, such as an energizer element and a cap element. The energizer element has a pair of opposed first surface features formed on a side portion that help retain the energizer element in a gland groove formed in the inner surface of the gland. The energizer element also includes a second surface feature associated with a top portion to form a first mechanical connection component. The cap element has a surface feature formed on a bottom portion to form a second connection component. The first and second connection components when coupled together to form a connection assembly enable the cap element to be mechanically linked or joined to the energizer element. The connection components help prevent or inhibit rotation of the cap element relative to the gland and to the energizer element. The connection assembly thus functions as an anti-rotation mechanism. Further, the sealing element assembly functions as a double-acting sealing assembly since the assembly is configured to absorb pressure from both sides (e.g., right side and left side) during use.

The mechanical seal of the present invention is shown for example in FIG. 1. The illustrated mechanical seal 10 can include a sealing assembly 16 that is mounted to stationary equipment 14 that has a movable shaft 12. The shaft 12 can form part of any selected stationary equipment, such as a pump or a valve, that requires sealing structure to form a fluid tight seal with the shaft. The illustrated sealing assembly 16 can include a gland 20 that is concentrically disposed about the shaft 12 and a sealing element assembly 18 that is seated snugly within the gland 20. The gland 20 can be secured or mounted to the stationary equipment by known fastening techniques. The gland 20 can have any selected configuration or size depending upon the specific type of stationary equipment that is employed, as is known in the art. The illustrated gland 20 includes a housing 22 that includes an inner surface 24 that has a gland groove 26 formed therein. The gland groove 26 can be sized and configured for seating at least partly the sealing element assembly 18. The sealing element assembly 18 can be positioned such that a portion of the sealing element assembly 18 contacts the rotating shaft 12 to form a fluid-tight seal. Alternatively, the gland 20 can be configured to have multiple gland grooves 26 formed therein, each of which can be sized and configured for seating a sealing element assembly 18. The gland groove 26 has a pair of opposed side walls 28A and a bottom or floor portion 28B. The number of gland grooves 26 and sealing element assemblies 18 can be related to the specific application and type of stationary equipment. The gland housing 22 can also optionally include a fluid passage (not shown) for introducing a selected fluid, such as a cooling or barrier fluid, to the shaft surface, or for circulating a fluid back to a reservoir housed within the stationary equipment 14. One example of stationary equipment suitable for employing multiple gland grooves 26 formed in the gland 20 includes a hydraulically driven chassis of an excavator, the drive chains of which are typically driven by a hydraulic drive motor. The drive motor can include hydraulic pumps that are located in the rotating superstructure, where return oil and leakage oil are returned to a hydraulic oil tank.

The sealing element assembly 18 of the present invention is shown in FIGS. 1-4. The illustrated sealing element assembly 18 can include multiple separate and discrete sealing elements or components. According to one embodiment, the sealing element assembly 18 includes a first sealing element that functions as an energizer or dynamic sealing element 30 and a second sealing element that functions as a sealing or cap element 50 that is coupled to the energizer element 30 and is configured and positioned to contact the shaft 12. The energizer element 30 and the cap element 50 can be mechanically coupled together and can be mounted within the gland groove 26 formed in the gland 20, such that the energizer element 30 contact the floor 28B of the gland groove 26 as well as the opposed side walls 28A to form a fluid tight seal. The cap element 50 also helps form a fluid tight seal against the shaft 12 so as to keep the process fluid of the stationary equipment contained therein. The sealing element assembly 18 thus functions as a double-acting sealing assembly since the assembly is configured to absorb pressure from both sides (e.g., right side and left side).

Figure 3:
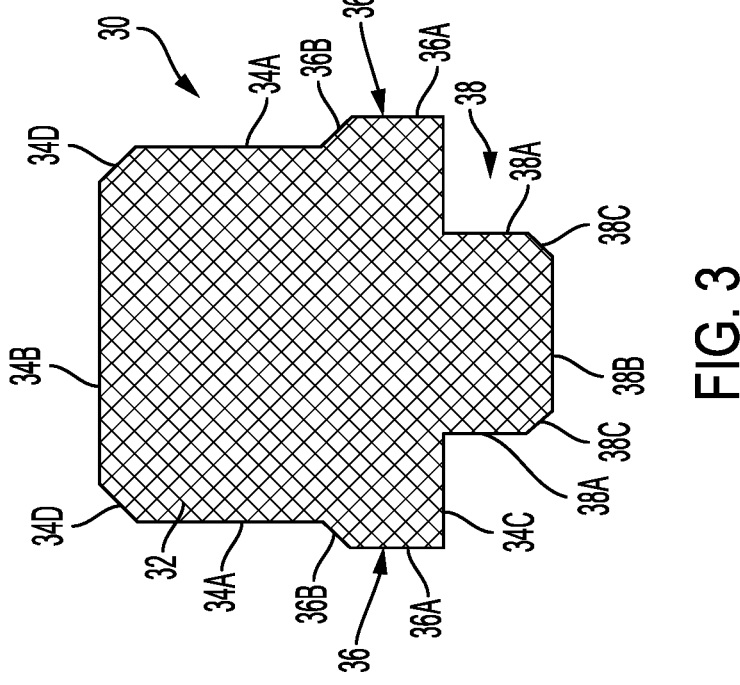
FIG. 3 is a partial cross-sectional view of the energizer component of the sealing element assembly according to the teachings of the present invention.
Figure 2:
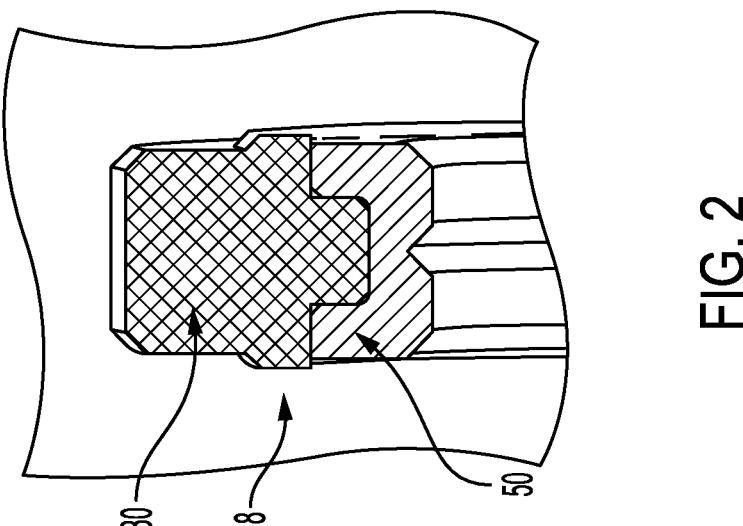
FIG. 2 is a partial cross-sectional view of the sealing element assembly (e.g., cap seal) employed by the mechanical seal of FIG. 1 according to the teachings of the present invention.

As shown in FIGS. 2 and 3, the illustrated energizer element 30 has a main body 32 that has opposed side portions 34A, a bottom portion 34B and an opposed top portion 34C. The energizer element 30 is sized and configured for seating within the gland groove 26. Specifically, the side portions 34A are sized and configured when disposed within the gland groove 26 to confront the side walls 28A thereof. Further, each of the side portions 34A is configured to have an outwardly extending surface feature 36 formed thereon. The surface feature 36 can be formed at any location along the side portions 34A between the bottom portion 34B and the top portion 34C. The surface feature 36 can have any selected size or shape and can preferably be configured as an outwardly extending flange. According to one embodiment, the flange 36 can have an outer surface 36A and one or more slanted or sloped surfaces 36B that connects the outer surface 36A and the side portion 34A. The width of the energizer element 30 at the outermost portion of the surface features can be greater that the width of the gland groove 26. As such, the outer surface 36A of the surface features 36 are sized and configured to contact the side walls 28A of the gland groove 26 when the energizer element 30 is mounted therein. The surface features 36 help retain the energizer element 30 within the gland groove 26 by way of a mechanical friction or press fit. The bottom portion 34B of the energizer element 30 can optionally contact the floor or bottom portion 28B of the gland groove 26 when the energizer element 30 is mounted therein. The side portions 34A or the bottom portion 34B can optionally have chamfered edges to form a pair of opposed slanted or sloped surfaces or edges 34D.

The top portion 34C of the energizer element 30 can also include an additional surface feature 38 that forms a first connection component for coupling together the energizer element 30 and the cap element 50. The surface feature 38 can have any selected shape, size or configuration suitable for coupling together the sealing elements. According to one embodiment, the first connection component takes the form of an outwardly extending surface feature that forms a male-type connection component. The surface feature 38 can include a pair of opposed side walls 38A and a top wall 38B. The side walls 38A or the top wall 38B can optionally have chamfered edges to form a pair of opposed sloped or slanted surfaces or edges 38C. The width of the second surface feature 38 as measured between the side walls 38A is preferably smaller or less than the width of the main body of the energizer element 30 as measured either between the outer surface 36A of the first surface feature 36 or between the side portions 34A. The surface feature 38 can be shaped as a plug type male connection component, as illustrated, or can be shaped as a tail like component forming part of a dovetail joint connection assembly when coupled together with the cap element 50. Those of ordinary skill in the art will readily recognize that the surface feature 38 can be alternatively shaped as a female type of connection component and can include a groove or channel of any size, shape or configuration.

Figure 4:
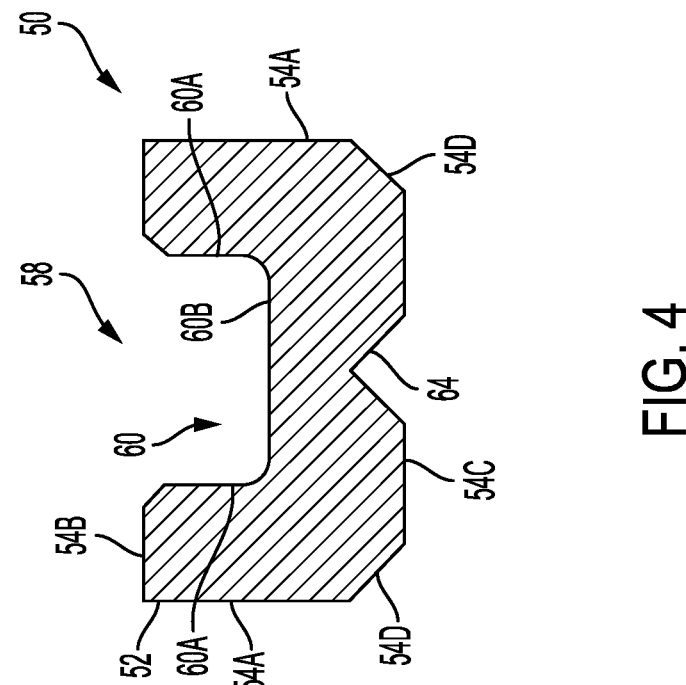
FIG. 4 is a partial cross-sectional view of the cap component of the sealing element assembly according to the teachings of the present invention.

As shown in FIGS. 2 and 4, the illustrated cap element 50 has a main body 52 that has opposed side portions 54A, a bottom portion 54B and an opposed top portion 54C. The bottom portion 54B can have a surface feature 58 associated therewith. The surface feature 58 serves as a connection component (e.g., second connection component) for the cap element 50 such that the cap element 50 can be coupled, connected or joined to the connection component of the energizer element 30 to form a connection assembly. The surface feature 58 can be a feature that protrudes from the bottom surface 54B or the surface feature can be formed within the bottom surface 54B. According to one embodiment, the surface feature 58 includes a channel or groove 60 that is formed within the surface of the bottom portion 54B. The groove 58 can be continuous or discontinuous about the circumference of the annular cap element 50. As illustrated, the groove 58 can be shaped as a female type connection component or can be shaped as a pin like (e.g., socket) connection component forming part of a dovetail joint connection assembly when coupled together with the energizer element 30. The channel 60 can have opposed side walls 60A and a bottom surface or floor 60B. The groove 60 can be configured to be complementary in shape to the shape of the surface feature 38 associated with the energizer element 30 to facilitate the joining together of the connection components by a friction or press fit to form the connection assembly. The connection assembly helps prevent relative movement or rotation between the energizer element 30 and the cap element 50. Specifically, the cap element 50 does not rotate with the shaft and hence move relative to the energizer element 30. The cap element 50 hence remains relatively stationary during use. As such, the connection assembly formed by the mating assembly of the surface features functions as an anti-rotation mechanism. The side portions 54A or the top portion 54C of the cap element 50 can optionally have chamfered edges to form a pair of opposed slanted or sloped surfaces or edges 54D. The top portion 54C of the cap element 50 can also include a surface feature 64. The surface feature 64 can have any selected shape, size or configuration. The surface feature 64 can preferably be an indentation or groove 64 that is formed in the top surface. The groove 64 helps reduce the contact area between the shaft 12 and the cap element 50 during use.

Figure 5:
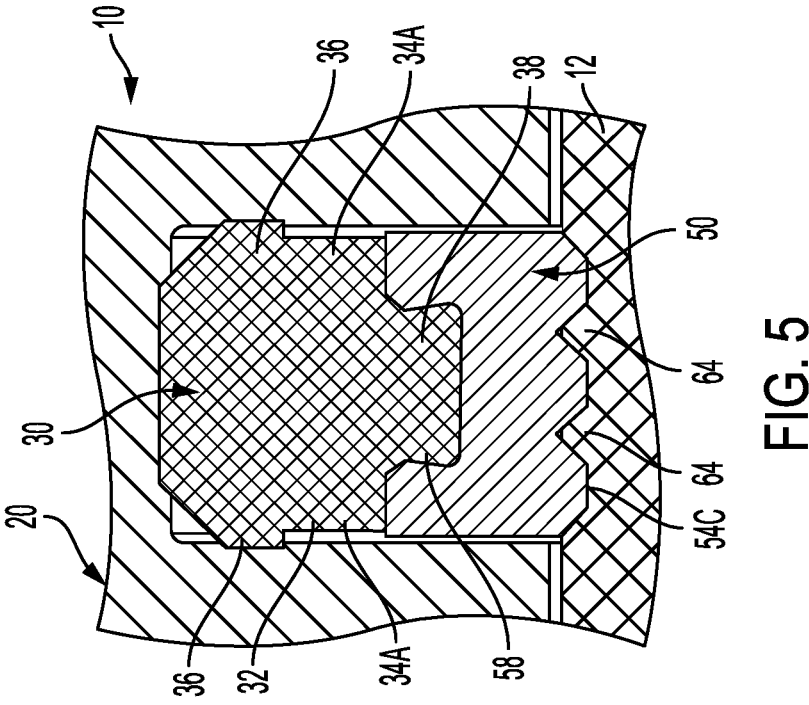
FIG. 5 is a partial cross-sectional view of a second embodiment of the sealing assembly according to the features of the present invention.

According to another embodiment, the energizer element 30 and/or the cap element 50 can be configured differently while concomitantly enabling the energizer element 30 to be coupled or connected to the cap element 50 via connection components that are associated therewith. Various different embodiments of the sealing elements are shown, for example, in FIG. 5, where like reference numerals designate like parts. The illustrated energizer element 30 can include surface features 36 that extend outwardly from the side portions 34A. The surface features, according to an alternate embodiment, can be positioned or located closer to or adjacent to the bottom portion 34B of the main body 32, as illustrated. The surface feature 38 associated with the top portion 34C can be formed as part of a dovetail joint. Specifically, the surface feature 38 can be formed as a tail portion of a dovetail joint. Similarly, the cap element 50 can include a surface feature 58 that is also formed as a complementary portion of the dovetail joint. For example, the groove 60 formed in the bottom portion 54B of the cap element 50 can be formed or shaped as a pin (e.g., socket) portion of the dovetail joint. Further, the top portion 54C of the cap element 50 can include multiple surface features, such as multiple indentations or grooves 64, as opposed to a single groove 64. The multiple surface features 64 formed in the top portion 54C can be the same or can be different.

The annular sealing components or elements comprising the sealing element assembly 18 can be configured to be connected or joined together, in any selected manner, that enables the sealing elements to be secured together so as to form a fluid tight seal between the sealing element assembly 18 and the shaft 12. In operation, the annular energizer element 30 is disposed within each gland groove 26 formed in the inner surface 24 of the gland 20. The surface feature 38 (e.g., protrusion) formed on each side portion 34A of the energizer element 30 can be oversized relative to the dimensions of the gland groove 26. The energizer element 30 can then be press-fit into the gland groove 26 such that the surface features or protrusions 38 contact the side walls 28A of the gland groove and the bottom portion 34B of the energizer element 30 can optionally contact the floor portion 28B of the gland groove 26. The protrusions 36 can help secure the energizer element 30 within the gland groove 26 and can help prevent accidental or unwanted rotation of the energizer element 30 within the groove 26. The energizer element 30 is thus self-retained in the gland groove 26 by press fitting the sealing element into the gland groove 26. The various contact points between the gland groove 26 and the energizer element 30 form sealing points or sealing locations that helps prevent the leakage of fluid, such as a process fluid, from the stationary equipment 14. The energizer element 30 can also include a surface feature 38 that is optionally shaped as a male type connection element.

The illustrated cap element 50 can then be coupled or joined to the energizer element 30. The cap element 50 can include a bottom portion 54B that has a surface feature 58 associated therewith. Specifically, the surface feature 58 can be configured as a recess or groove 60. The protrusion 38 of the energizer element 30 is configured to seat within and connect to the groove 60 formed in cap element 50 with a friction or press type fit. The protrusion 38 is thus shaped as a male type connecting element (e.g., a ring plug or first connection component) that is configured to seat within the complementary shaped groove 60 (e.g., ring groove or second connection component) formed in the cap element 50. Those of ordinary skill in the art will readily recognize that the surface feature 38 of the energizer element 30 can be alternately formed as a female-type connection element and the surface feature 58 of the cap element 50 can be alternately formed as a male-type connection element. The connection assembly formed by the surface features 38, 58 of the sealing elements (e.g., the energizer element 30 and the cap element 50) help secure the sealing elements together and helps prevent rotation of the cap element 50 relative to the energizer element 30 when coupled together. The top portion 54C of the cap element 50 is energized by the energizer element 30 to form a dynamic seal, and when the cap element 50 is energized, contacts the shaft 12 during use to help prevent leakage of the process fluid from the stationary equipment 14 along the shaft 12. The energizer sealing element 30 thus serves to force or press the cap element 50 against the shaft 12 to form a dynamic fluid-tight seal. The mating connection of the surface features 38, 58 connects the sealing elements together to prevent rotation, and the protrusions 36 formed on the energizer element 30 form an oversized sealing element that can be pressed into the gland groove 26 so that the entire sealing assembly 16 is prevented from rotating on the shaft 12. The fluid tight seal between the cap element 50 and the shaft 12 helps stop or prevent process fluid from migrating along the shaft 12 from either direction (e.g., from right to left or vice versa). The coupling together of the sealing elements helps prevent the cap element 50 from slipping through when the shaft 12 rotates or from rotating along with the shaft. Further, the grooves 64 formed on the top portion 54C of the cap element 50 serves to reduce the overall sealing or contact area or surface that contacts the shaft 12 to help reduce the overall friction created by the mating engagement of the cap element 50 and the shaft 12.

The sealing assembly 16 of the present invention is configured to seal rotary unions or similar rotary applications that employ a rotating shaft. One of the main challenges in conventional cap seal designs used in higher speed rotary applications is the relative movement that occurs between the seal components forming the seal assembly. The relative movement between the seal components can lead to overall seal failure. The equipment can employ the gland 20 having a gland groove 26 that is configured to seat the sealing assembly 16. The sealing assembly 16 of the present invention is configured such that there is no relative movement between the seal components forming the sealing element assembly 18.

The rotating union between the shaft 12 and the sealing element assembly 18 enables fluids (e.g., gases and liquids) to make a sealed transition between a stationary body (e.g., sealing assembly 16) and a rotating body (e.g., shaft 12), or between bodies rotating against each other. The sealing assembly 16 provides for selected advantages of low friction and simple groove design. According to one practice, the sealing assembly 16 of the present invention can be used to seal swiveling, helically moving and/or rotating pistons, rods and shafts forming part of mechanical equipment, such as an excavator and the like. Specifically, a typical application can include a hydraulically driven chassis of excavators, the drive chains of which are driven by hydraulic motors. The drive motor including hydraulic pumps is located in the rotating superstructure, where return oil and leakage oil have to be returned to the hydraulic oil tank. The rotary unions can be single-flow (i.e., single-channel) or multi-flow (i.e., multi-channel). The sealing assembly 16 can be configured to help seal fluids, such as hydraulic fluid, is moved or pumped back and forth under high pressure. The stationary equipment 14 can employ single-flow bushings that often use axial, multi-flow, primarily radial interfaces to transfer the fluid. The rotating union is also a device that enables a mechanical rotary movement to be transmitted through a container wall. Suitable applications can include, for example, vacuum technology.

The energizer element 30 can have a hardness that is less than the hardness of the cap element 50. Specifically, the energizer element 30 can be made of any suitable elastomeric material, such as rubber, nitrile rubber (NBR), a fluoro-rubber material such as a fluorine kautschuk material (FKM), a synthetic rubber such as ethylene propylene diene monomer (EPDM), a polymer such as polyurethane (PU), and the like. The energizer element 30 can have a hardness in the range between about 60 Shore A and about 80 Shore A. The cap element 50 can be made of a synthetic fluoro-polymer such as polytetrafluoroethylene (PTFE), a synthetic resin such as polyethylene (PE), a polyamide material (PA), a polyurethane material, and the like. The cap element 50 can have a hardness value of between about 50 Shore A and about 75 Shore D.

An initial sealing force can be created by the radial energizing load or force applied by the energizer element 30 on the cap element 50. Additional sealing force is created as the process pressure increases and acts on the energizer element 30, thereby preventing any leakage but not applying excessive frictional forces. A key attribute of the sealing assembly 16 of the present invention is the ability to resist rotation and remain stationary in the gland groove 26 while the shaft 12 rotates. This is particularly advantageous in high-speed rotary shaft applications.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A seal assembly, comprising:
   a gland having an inner surface having a gland groove formed in the inner surface, wherein the gland groove includes opposed flat first and second side walls and a floor portion, and
   a sealing assembly sized and configured for mounting at least partly within the gland groove, wherein the sealing assembly includes:
   an energizer element having a main body having first and second opposed side portions, a bottom portion, and a top portion, wherein each of the first and second side portions has an outwardly extending first surface feature formed thereon that is sized and configured for contacting the flat side walls of the gland groove when the energizer element is seated within the gland groove, and wherein the top portion has associated therewith a second surface feature outwardly extending therefrom forming a first connection component, and
   a cap element having a main body having first and second opposed side portions, a bottom portion and an opposed top portion, wherein the bottom portion has associated therewith an inwardly extending surface feature forming a second connection component, wherein the first connection component and the second connection component are coupled together via a press-fit to form a connection assembly that inhibits rotation of the cap element relative to the energizer element, and wherein a width of the energizer element at an outermost portion of the first surface features is greater that a width of the gland groove, such that the energizer element is seated within the gland groove and contacts both the first and second sidewalls to form a press-fit so as to be self-retained in the groove.

2. The seal assembly of claim 1, wherein the outwardly extending first surface features are formed along the side portions between the bottom portion and the top portion.

3. The seal assembly of claim 2, wherein the bottom portion of the energizer element contacts the floor portion of the gland groove when the energizer element is mounted therein.

4. The seal assembly of claim 3, wherein the second surface feature comprises first and second opposed side walls and a top wall connecting the first and second side walls.

5. The seal assembly of claim 4, wherein one or more of the first and second side walls or the top wall includes chamfered edges to form a pair of opposed sloped or slanted surfaces.

6. The seal assembly of claim 5, wherein a width of the second surface feature as measured between the side walls is less than a width of the main body as measured between the side portions.

7. The seal assembly of claim 6, wherein the surface feature of the cap element comprises a channel that is formed within the bottom portion.

8. The seal assembly of claim 7, wherein the side portions or the top portion of the main body of the cap element includes one or more chamfered edges.

9. The seal assembly of claim 8, wherein the top portion of the cap element comprises one or more grooves formed in an intermediate portion for reducing a contact area between the shaft and the cap element during use.

10. A sealing element assembly suitable for mounting in a gland groove formed in a gland of a mechanical seal, comprising:

an energizer element having a main body having first and second opposed side portions, a bottom portion, and a top portion, wherein each of the first and second side portions has an outwardly extending first surface feature formed thereon that is sized and configured for contacting side walls of the gland groove when the energizer element is seated therein upon initial mounting, and wherein the top portion has associated therewith a second surface feature forming a first connection component, and a cap element having a main body having first and second opposed side portions, a bottom portion and an opposed top portion, wherein the bottom portion has associated therewith a surface feature forming a second connection component, wherein the first connection component and the second connection component are coupled together by a press-fit to form a connection assembly that inhibits rotation of the cap element relative to the energizer element, and wherein a width of the energizer element at an outermost portion of the surface features is greater that a width of the gland groove, such that the energizer element is seated within the gland groove by a press fit so as to be self-retained in the groove.

11. The sealing element assembly of claim 10, wherein the outwardly extending surface features of the energizer element are formed along the side portions between the bottom portion and the top portion.

12. The sealing element assembly of claim 11, wherein the second surface feature of the energizer element is configured to extend outwardly from the top portion to form the first connection component.

13. The sealing element assembly of claim 12, wherein the second surface feature comprises first and second opposed side walls and a top wall connecting the first and second side walls, wherein one or more of the first and second side walls or the top wall includes chamfered edges to form a pair of opposed sloped or slanted surfaces.

14. The sealing element assembly of claim 12, wherein the second surface feature comprises first and second opposed side walls and a top wall connecting the first and second side walls, wherein a width of the second surface feature as measured between the first and second side walls is less than a width of the main body as measured between the side portions.

15. The sealing element assembly of claim 12, wherein the surface feature of the cap element comprises a channel that is formed within the bottom portion.

16. The sealing element assembly of claim 15, wherein the top portion of the cap element comprises one or more grooves formed therein for reducing a contact area between the shaft and the cap element during use.

* * * * *